(12) United States Patent
Richards

(10) Patent No.: US 10,026,085 B2
(45) Date of Patent: Jul. 17, 2018

(54) CROSS-CHANNEL SECURITY AUTHENTICATION

(71) Applicant: NCR Corporation, Duluth, GA (US)

(72) Inventor: Andrew William Richards, Kitchener (CA)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/085,039

(22) Filed: Mar. 30, 2016

(65) Prior Publication Data

US 2017/0286956 A1    Oct. 5, 2017

(51) Int. Cl.
| | |
|---|---|
| *G06K 5/00* | (2006.01) |
| *G06Q 20/40* | (2012.01) |
| *G06K 19/06* | (2006.01) |
| *G06K 7/14* | (2006.01) |
| *G07F 7/12* | (2006.01) |

(52) U.S. Cl.
CPC ......... *G06Q 20/401* (2013.01); *G06K 7/1404* (2013.01); *G06K 19/06112* (2013.01); *G07F 7/127* (2013.01)

(58) Field of Classification Search
CPC ... G07F 7/122; G07F 7/1016; G06Q 30/0601; G06Q 20/20
USPC ........................ 235/380, 381, 383
See application file for complete search history.

(56) References Cited

U.S. PATENT DOCUMENTS

| | | | | |
|---|---|---|---|---|
| 6,908,031 | B2* | 6/2005 | Seifert | G06Q 20/00 235/379 |
| 8,196,131 | B1* | 6/2012 | von Behren | G06Q 20/367 705/64 |
| 9,400,977 | B2* | 7/2016 | Brown | G06Q 20/3227 |
| 2013/0110727 | A1* | 5/2013 | Kobres | G06Q 20/023 705/67 |
| 2013/0256403 | A1* | 10/2013 | MacKinnon Keith | G06K 5/00 235/375 |

* cited by examiner

*Primary Examiner* — Daniel St Cyr
(74) *Attorney, Agent, or Firm* — Schwegman, Lundberg & Woessner

(57) ABSTRACT

Various embodiments each include at least one of systems, devices, methods, and software for cross-channel security authentication, such as with regard to providing of payment card (e.g., credit and debit card) data for payment within a transaction. One such embodiment, in the form of a method includes receiving, by a payment account app on a mobile device, a payment authorization request and subsequently receiving approval or denial input within the payment account app following receipt of valid payment account authentication input. This method, following receipt of approval input, further includes generating authorized payment output to provide in response to the received payment authorization request.

10 Claims, 5 Drawing Sheets

| RETAILER APP | PAYMENT/BANKING APP | PAYMENT ACCOUNT CUSTODIAN |
|---|---|---|
| 1. CUSTOMER INITIATES PURCHASE AND SELECTS PAYMENT VIA A PAYMENT/ BANKING APP ON THE MOBILE DEVICE | | |
| 2. MAKE API CALL TO THE PAYMENT/BANKING APP INCLUDING PAYMENT DATA (E.G., AMOUNT, PAYEE, DATE, LIST OF ITEMS TO PURCHASE, ETC.) | 3. PAYMENT/BANKING APP LAUNCHES, IF NOT RUNNING, AUTHENTICATE USER, PRESENT PAYMENT REQUEST DATA, REQUEST APPROVE/DENY/CANCEL INPUT | |
| 4.A.1. ON DENY/CANCEL RETURN RECEIVED – PRESENT NOTICE IN APP AND REQUEST OTHER PAYMENT OR CANCELATION | 4.A. RECEIVE DENY/ CANCEL INPUT – RETURN INDICATION TO RETAILER APP, RETURN TO PAYMENT/BANKING APP HOME SCREEN OR CLOSE APP, RETURN FOCUS TO RETAILER APP | |
| 4.B.1. ON APPROVAL RETURN RECEIVED – PROCESS PAYMENT VIA RETAILER BACKEND SYSTEM BASED ON RECEIVED PAYMENT DATA. | 4.B. RECEIVE APPROVAL INPUT – RETURN APPROVED TO RETAILER APP WITH PAYMENT CARD/ ACCOUNT DATA OR ABSTRACTION THEREOF AND TRANSMIT PAYMENT APPROVED DATA TO PAYMENT ACCOUNT CUSTODIAN, RETURN TO PAYMENT/BANKING APP HOME SCREEN OR CLOSE APP, RETURN FOCUS TO RETAILER APP | 4.B.2. STORE DATA REPRESENTATIVE OF APPROVED TRANSACTION INDICATING THE PAYMENT WILL BE FORTHCOMING ON A PAYMENT TRANSACTION PROCESSING NETWORK |

*FIG. 2*

CROSS-CHANNEL SECURITY AUTHENTICATION

BACKGROUND INFORMATION

The Internet and credit and debit card payments have become staples upon which modern commerce relies. As a result, data security has become a paramount concern and exposure point for businesses and individuals a like. An intersection of these market forces and risks is when making payments online through web browsers or apps or via other mechanisms. Card transaction processors charge higher transaction fees when a payment card is not present, as opposed to lower fees when the payment card is present. Large volumes of transaction data may reveal that greater risk of fraud exists in transactions where a payment card is not present, but the risk still exists with regard to each transaction regardless of whether a card is present as the criminal community has become very adept at their craft. Regardless, merchants pay these higher fees, which erode profitability, even though they have little ability to enhance transaction security.

Advances have been made in both fraud prevention technology development and deployment in recent years. However, these technology development and deployment advances have been few in the areas of online and app-based commerce. Even outside of online and app-based commerce, despite advancements in, and deployment of, mobile payment solutions, security gaps remain.

SUMMARY

Various embodiments each include at least one of systems, devices, methods, and software for cross-channel security authentication, such as with regard to providing of payment card (e.g., credit and debit card) data for payment within a transaction. One such embodiment, in the form of a method includes receiving, by a payment account app on a mobile device, a payment authorization request and subsequently receiving approval or denial input within the payment account app following receipt of valid payment account authentication input. This method, following receipt of approval input, further includes generating authorized payment output to provide in response to the received payment authorization request.

Another method embodiment includes receiving, via a network from a payment account app that executes on a mobile device, approved payment transaction data including data identifying an authenticated payment account, a payment amount, and a payee identifier. This method may then store the approved payment transaction data at least until a corresponding payment transaction is received via a payment processing network and matched with the approved payment transaction data indicating the transaction of the approved transaction data was initiated and approved by an authenticated account holder via the payment account app that executes on the mobile device.

A further embodiment, in the form of a device, includes at least one processor, at least one memory device, at least one input device, a display device, and at least one network interface device. The device of such embodiments further includes a payment account app stored in the at least one memory device and executable by the at least one processor to perform data processing activities. In some such embodiments, the data processing activities include receiving a payment authorization request, presenting a representation of the payment authorization request on the display device, and receiving approval or denial input via the at least one input device following receipt of valid payment account authentication input via the at least one input device. In some embodiments, following receipt of approval input, the data processing activities include generating authorized payment output to provide in response to the received payment authorization request and transmitting, via the at least one network interface device, data indicating receipt of the approval input to a payment authorization process of a financial institution that maintains the payment account, the indication of receipt of the approval input notifying the financial institution that an authenticated payment request will be forthcoming via a payment processing network.

BRIEF DESCRIPTION OF THE DRAWINGS

FIG. 2 is a chart illustrating entity data processing activity flows, according to an example embodiment.

DETAILED DESCRIPTION

Figure 1:
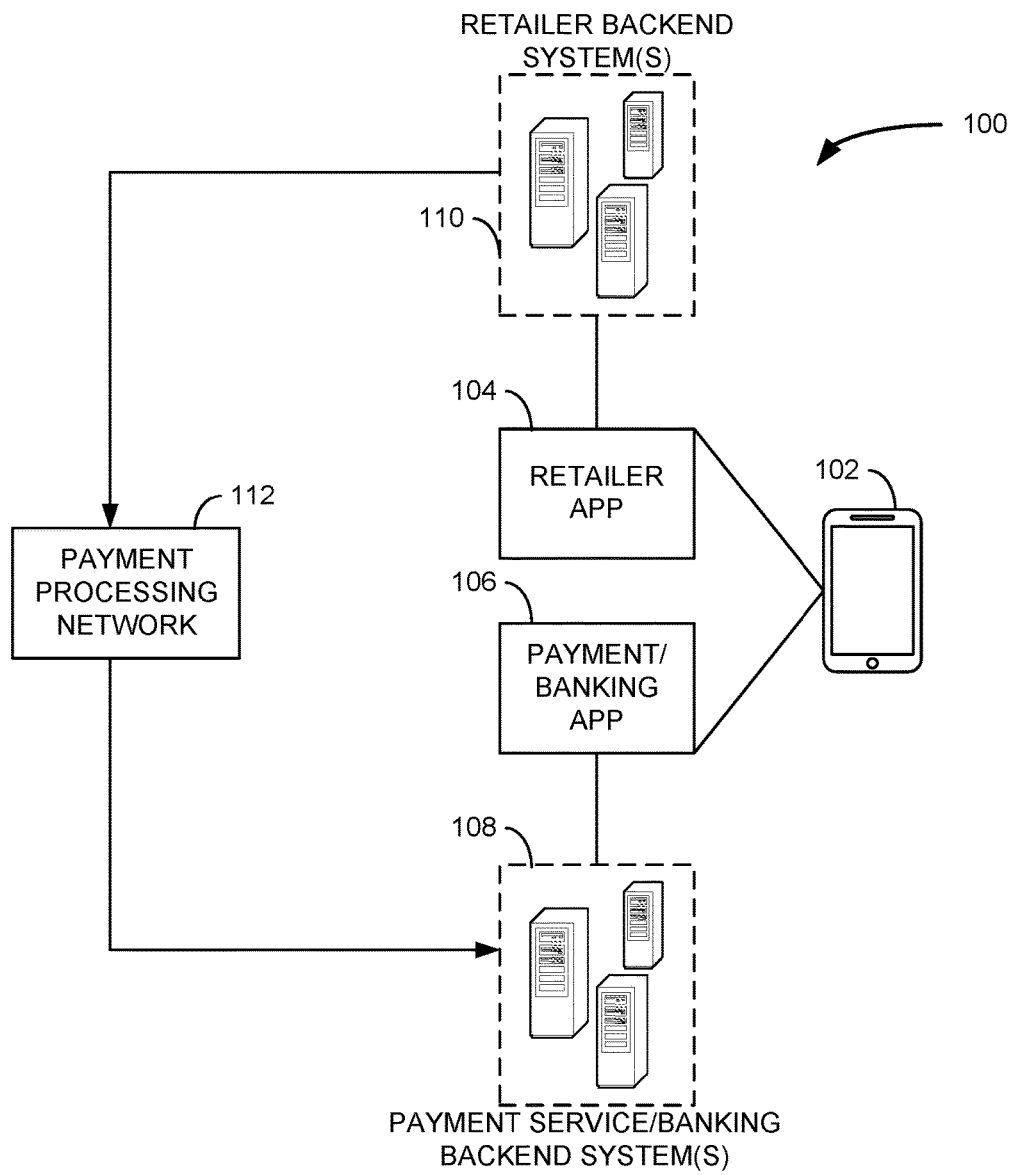
FIG. 1 is a logical block diagram of a system architecture, according to an example embodiment.

Various embodiments each include at least one of systems, devices, methods, and software for cross-channel security authentication, such as with regard to providing of payment card (e.g., credit and debit card) data for payment within a transaction. Some such embodiments enable a consumer to initiate a transaction via one channel and to provide payment data, such as credit or debit card data and authorization via a second channel. For example, a consumer or other payor may initiate a transaction within a first mobile device app and when payment details are to be provided, be taken automatically to a second mobile device app, such as a banking app or app of a payment card provider, to login and authorize the payment. The second mobile device app may then return payment card data to the first mobile device app which then initiates processing of the payment. At the same time, the second mobile device app may transmit data representative of the authorized payment to the bank or payment card provider to give notice that the payment transaction was authorized by the holder of the payment account, as well as to place a hold on funds or credit in the account to satisfy the payment when it is eventually received via a payment transaction network, such as a credit card network. Such transactions in some embodiments, having been initiated by an authenticated payment account holder and authorized via an app of the payment card provider, may be processed just as if the payment card were physically present in the transaction and the retailer is charged the lower card-present payment transaction processing fee rather than the card-not-present payment transaction processing fee.

In other embodiments, the transaction may be initiated at a point-of-sale (POS) terminal once items to be purchased in a transaction have been entered. The POS terminal may then display a barcode to be scanned by a payment card or banking app to initiate payment or a payment prompt to be forwarded to the mobile device to initiate payment tendering via a payment card or banking app according to account settings associated with a customer loyalty account. In such embodiments, the payor authenticates by logging into the payment card or banking app on their mobile device, views presented details about the requested payment, and approves the payment. A message including payment details may be returned to the requestor, such as when the payment request was received by the mobile device according to an association with a customer loyalty account or when scanning a barcode that includes payee details, or the mobile device app may then present a barcode including the payment account details that can be scanned by a barcode reader of the payee (i.e., the retailer). In some such embodiments, the payment card data may be provided with at least a portion of the data being a tokenized representation thereof, such as a sequenced value, random value, or hashed value of one or more of a credit card number, card expiration date, and other card data, but including clear text of a sufficient portion of the payment card data to be processed via conventional payment processing networks. The tokenized element of the payment card data may have sufficient meaning in either the tokenized form or in a de-hashed (e.g., decrypted) form for processing by at least one of the payment transaction network and the card issuer. Sequenced and random values typically have meaning only to one of the card issuer, transaction processing network, or bank.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural logical and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100 architecture, according to an example embodiment. The system 100 is an example of an architecture on which some embodiments may be implemented. The system 100 includes a mobile device 102, such as a smartphone, smart-watch, tablet, smart-controller of an automobile, a television set-top-box, a laptop computer, and the like. Although illustrated and referred to as a mobile device 102, the mobile device 102, in some other embodiments, may be a desktop computer.

The mobile device 102, in some embodiments, includes a retailer app 104 within which a user may view products offered for sale and make purchases of the products. The mobile device 102 also includes at least one payment/banking app 106. The payment/banking app 106 will be generally referred to as banking app 106 for simplicity. However, the banking app 106 is generally a mobile device app within which a user may authenticate an identity, such as providing a user name and password, a biometric input, or other data depending on the particular mode of authentication within the particular banking app 106. The banking app 106 may allow an authenticated user to view account information, such as savings, checking, investment, credit card, and prepaid debit card balances. However, at the very least in such embodiments, the banking app 106 is able to authenticate the user, receive payment requests from the retailer app 104, present details of received payment requests, receive user input to approve or deny a requested payment, and return payment account data (e.g., credit or debit card or other payment account data to the requesting retailer app 104). The banking app 106 may further transmit a data representation of an approved payment to a payment service/banking backend system 108 via a network interface device of the mobile device 102. The payment service/banking backend system 108 may then store the received approved payment data representation at least until the payment data is received via a payment processing network 112, such as a credit card data interchange network, a check automated clearinghouse network when the payment data provided is that of a checking account, or other such payment processing network.

The retailer app 104, upon receipt of the payment account data, then processes the payment for the transaction via generally conventional means. This typically includes transmitting transaction data to one or more retailer backend systems 110, which then process the payment according to the received payment account data via the payment processing network 112.

FIG. 2 is a chart 200 illustrating entity data processing activity flows, according to an example embodiment. More specifically, the chart 200 illustrates the data processing activities of a retailer app and a payment/banking app that execute on a mobile device of customer of a provider of the retailer app as well as data processing activities of a payment account custodian. The payment account custodian may be a bank, a credit or debit card issuer, and the like.

The chart 200 illustrates the data processing activities at four general stages. The first stage, illustrated by the number one (1), involves a customer interacting with a retailer mobile device app initiating a purchase. The customer may then be presented with one or more payment options such as inputting payment account data or using payment account data already stored with the provider of the retailer app. Another option the user may be presented with is an option to provide authenticated payment account data via one or more banking or payment account apps that are also present on the mobile device. Note that the retailer app, via interaction with an application programming interface (API) of an operating system of the mobile device may be aware of one or more banking or payment account apps that are also present on the mobile device. However, in some embodiments, the presence of one or more banking and payment account apps may be provided as configuration input to the retailer app. Regardless, a user may be presented with an option to select to pay by authenticating via a banking or payment account app which will then return data for processing the payment. The retailer app, upon receipt of a user selection or as a default configuration with regard to the user providing payment information via a banking or payment account app, proceed to the second stage.

The second stage (2), involves the retailer app making an API call to the banking or payment app. The API call is made with a data representation with regard to the requested payment, such as one or more of a payment amount, an identifier of the payee, a date, some details of one or more items to be purchased, and the like and the data processing activities of the chart move to stage three (3).

The API call is then received by the banking or payment app to begin stage three (3). Receipt of the API call may then cause the banking or payment app to launch if it is not already running on the mobile device. In some embodiments, when the banking or payment app is already running, that app will then receive focus on the mobile device and be presented. The user, if not already authenticated, will then be requested to authenticate their identity, such as by providing a user name and password, a biometric input (e.g., a fingerprint), or other authenticating input. Once the user is authenticated, the banking or payment app will then present a representation of the payment request data received from the retailer app and provide selectable options to approve, deny, or cancel the payment request and the data processing activities of the chart 200 move to stage four (4).

Stage four (4) of the data processing activities of the chart 200 involve two sub-stages 4.A. and 4.B. Sub-stage 4.A. involves processing when the user cancels the payment processing, such as if an error where made in selecting the mode of providing payment data, or denying the payment, similarly if there was an error or if the user otherwise had a change of mind or the request was not initiated by the user. When deny or cancel input is received at sub-stage 4.A. the processing within the banking or payment app involves returning an indication to the retailer app of the deny or cancel input received, returning the banking or payment app to a home screen or closing the app. and returning focus on the mobile device to the retailer app. The processing of sub-stage 4.A. then returns to the retailer app at sub-stage 4.A.1. where a notice may be presented by the retailer app of the received input and a request for input of another payment mode or a cancelation of the purchase transaction is requested.

Sub-stage 4.B. involves processing when the user provides approval input to approve the payment requested by the banking or payment app at stage three (3). When the approval input is received, the banking or payment app may return approved to the retailer app with payment card/account data or an abstraction thereof, such as a tokenized version of the data which may include a hashing of at least a portion of the data. Sub-stage 4.B. processing also may include a transmission of a payment approved data to a payment account custodian system to make the payment account custodian system aware of the payment transaction that will be forthcoming on a payment transaction network. The banking or payment app may then be returned to a home screen or closed and focus on the mobile device returns to the retailer app.

The processing of sub-stage 4.B. then proceed concurrently to the retailer app at sub-stage 4.B.1. and to the payment account custodian at sub-stage 4.B.2. In the retailer app at sub-stage 4.B.1., the retailer app received the approval and payment account data and processes the payment via a retailer backend system. The payment account custodian, upon receipt of the data representative of the approved transaction at sub-stage 4.B.2. stores the data indicating an authenticated user (i.e., account holder) has approved a payment transaction that is forthcoming on a payment transaction network. The payment account custodian may place a hold on funds or available credit of the user account.

Figure 3:
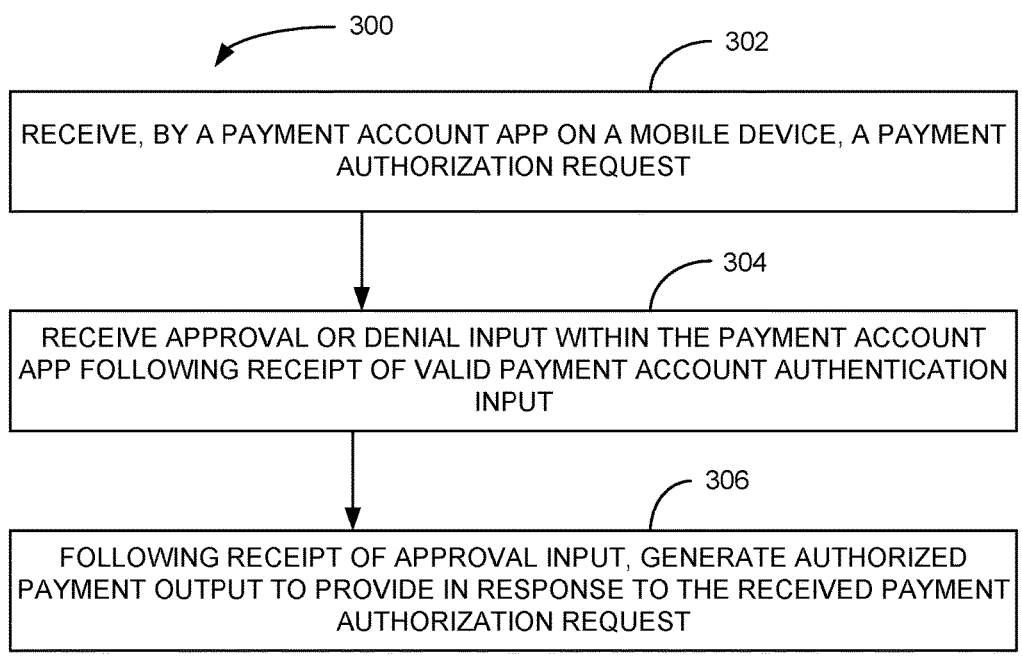
FIG. 3 is a block flow diagram of a method, according to an example embodiment.

FIG. 3 is a block flow diagram of a method 300, according to an example embodiment. The method 300 is an example method that may be implemented within a payment authorizing app that executes on a mobile device, such as an app provided by one or more of banks, credit or debit card issuers, prepaid card issuers, and the like.

The method 300 includes receiving 302, by a payment account app on a mobile device, a payment authorization request and receiving 304 approval or denial input within the payment account app following receipt of valid payment account authentication input. Following receipt of approval input, the method 300 includes generating 306 authorized payment output to provide in response to the received payment authorization request.

In some embodiments, the authorized payment output includes payment account data for processing of the payment request on a payment processing network. In some such embodiments, at least a portion of the payment account data is tokenized, such as by generating a hashed representation thereof or a portion thereof. In other embodiments, the tokenized representation may be a transaction number assigned by a custodian of the payment account, the payment account app, a payment transaction processor, or other entity.

In these and some other embodiments, the payment authorization request is received 302 by the payment account app as an app-to-app call on the mobile device from another app on the mobile device requesting payment, such as through an API call. Such embodiments may further return the authorized payment output to the app requesting payment. In some such embodiments, generating 306 the authorized payment output includes generating a scanable barcode encoded with data to facilitate processing of the requesting payment by a source of the payment authorization request and presenting the scanable barcode on a display of the mobile device. The barcode may then be scanned by a barcode scanner, or similarly imaged and read by a suitable imaging device and barcode reading software, to enable a POS terminal to obtain the payment output data to enable processing of the payment by the retailer or other entity.

In some embodiments, the received 302 payment authorization request includes a payment amount and payee identifying data. In some such embodiments, the method 300 further includes retrieving an available funds amount of the payment account over a network by the payment account app on the mobile device from a process of a financial institution that maintains the payment account and verifying the payment amount included in payment authorization request is no greater than the retrieved available funds amount. The available funds amount is typically a lesser amount of a daily payment account limit and an amount of funds within a pre-paid account or a credit limit of a post-paid account.

In some embodiments, upon receipt 302 of the payment authorization request, the method 300 includes transmitting, by the payment account app from the mobile device over a network to a payment authorization process of a financial institution that maintains the payment account, the received payment authorization request augmented with at least payment account identifying data. Such embodiments further include receiving, by the payment account app on the mobile device, an authorization of the payment authorization request from the payment authorization process and presenting a user interface on the mobile device within which the approval or denial input is received. Such embodiments operate to first verify that the payment transaction is approved by the payment authorization process of the custodian of the payment account, such as a bank or credit card issuer, before providing the user an option to approve the received 302 payment request. Further, upon receipt of the approval input, the method 300 in such embodiments includes transmitting data indicating receipt 304 of the approval input in the payment account app from the mobile device to the payment authorization process of the financial institution. The indication of receipt 304 of the approval input notifies the financial institution that a payment request will be forthcoming via a payment processing network.

Figure 4:
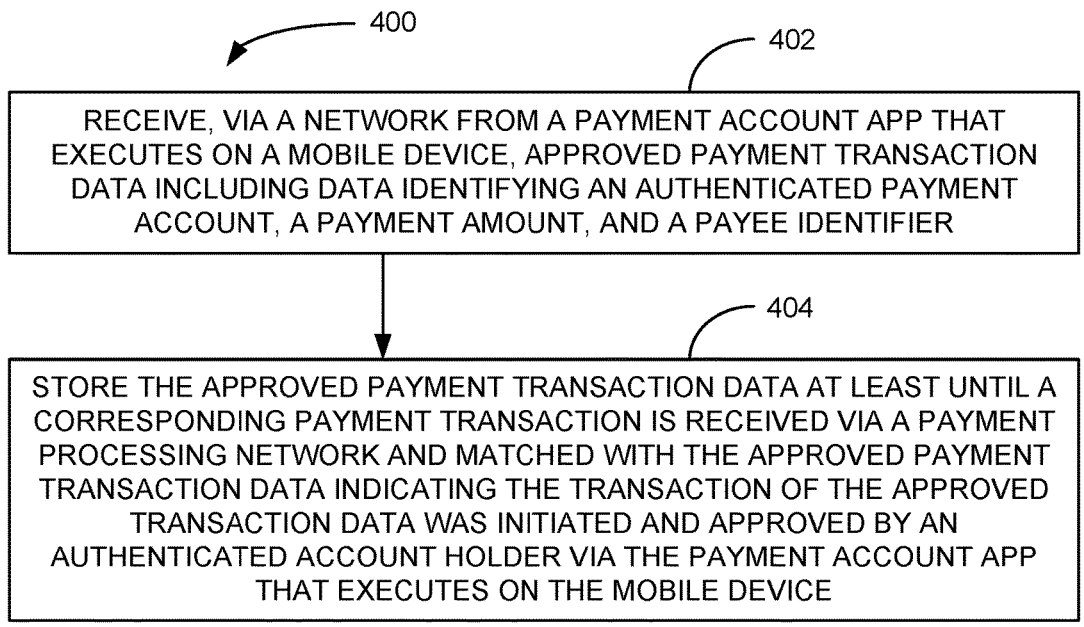
FIG. 4 is a block flow diagram of a method, according to an example embodiment.

FIG. 4 is a block flow diagram of a method 400, according to an example embodiment. The method 400 is an example of a method that may be performed by or on a computing system of a bank, credit or debit card issuer, or custodian of other payment accounts or payment account-types.

The method 400 includes receiving 402, via a network from a payment account app that executes on a mobile device, approved payment transaction data including data identifying an authenticated payment account, a payment amount, and a payee identifier. The authentication of payment account typically involves a user logging into their payment account on the mobile device within the payment account app by providing a user name and password, a biometric input, or the like. The method 400 further includes storing the approved payment transaction data at least until a corresponding payment transaction is received via a payment processing network and matched with the approved payment transaction data indicating the transaction of the approved transaction data was initiated and approved by an authenticated account holder via the payment account app that executes on the mobile device.

In some embodiments of the method 400, the received 402 approved payment transaction data further includes a token that is provided by the payment account app to the payee, is subsequently received via the payment processing network, and is utilized in the matching of the transaction received via the payment processing network with the approved payment transaction data. The token may be a hashed representation of at least a portion of the approved payment transaction data.

Some embodiments of the method 400 further include transmitting, via the network to the payment account app, an approval of the transaction of the approved payment transaction when a payment amount is no greater than a lesser amount of a daily payment account limit and an amount of funds within a pre-paid account or a credit limit of a post-paid account. Some such embodiments further include receiving, via the network from the payment account app, an indication of tendering of the payment of the approved payment transaction. This indication provides confirmation that the pre-approved transaction has been completed.

Figure 5:
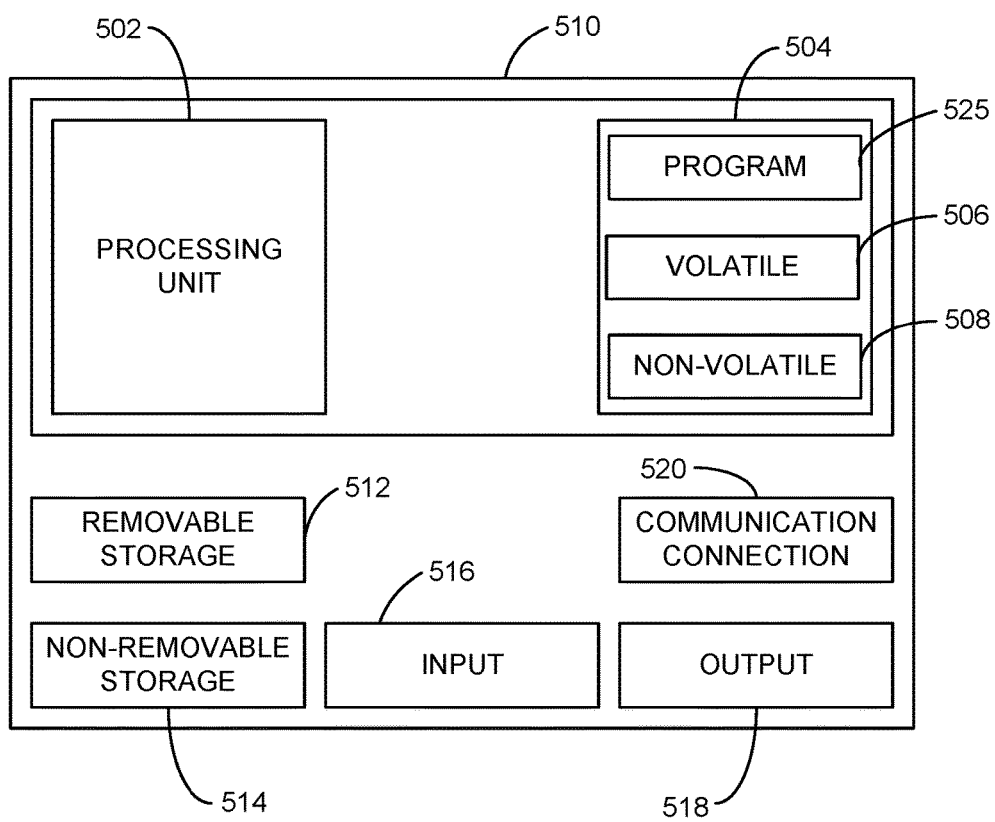
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Although the example computing device is illustrated and described as computer 510, the computing device may be in different forms in different embodiments. For example, the computing device may instead be a smartphone, a tablet, smartwatch, or other computing device including the same or similar elements as illustrated and described with regard to FIG. 5. Devices such as smartphones, tablets, and smartwatches are generally collectively referred to as mobile devices. Further, although the various data storage elements are illustrated as part of the computer 510, the storage may also or alternatively include cloud-based storage accessible via a network, such as the Internet.

Returning to the computer 510, memory 504 may include volatile memory 506 and non-volatile memory 508. Computer 510 may include—or have access to a computing environment that includes a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM). Digital Versatile Disks (DVD) or other optical disk storage, magnetic cassettes, magnetic tape, magnetic disk storage or other magnetic storage devices, or any other medium capable of storing computer-readable instructions.

Computer 510 may include or have access to a computing environment that includes input 516, output 518, and a communication connection 520. The input 516 may include one or more of a touchscreen, touchpad, mouse, keyboard, camera, one or more device-specific buttons, one or more sensors integrated within or coupled via wired or wireless data connections to the computer 510, and other input devices. The computer 510 may operate in a networked environment using a communication connection 520 to connect to one or more remote computers, such as database servers, web servers, and other computing device. An example remote computer may include a personal computer (PC), server, router, network PC, a peer device or other common network node, or the like. The communication connection 520 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 520 may also or alternatively include a transceiver device, such as a BLUETOOTH® device that enables the computer 510 to wirelessly receive data from and transmit data to other BLUETOOTH® devices.

Computer-readable instructions stored on a computer-readable medium are executable by the processing unit 502 of the computer 510. A hard drive (magnetic disk or solid state), CD-ROM, and RAM are some examples of articles including a non-transitory computer-readable medium. For example, various computer programs 525 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   receiving, by a payment account app on a mobile device, a payment authorization request including a payment amount and payee identifying data, the payment authorization request received on the mobile device as an app-to-app call from another app on the mobile device that is requesting payment, the payment authorization request triggering execution of the payment account app which then receives the payment authorization request;
   retrieving an available funds amount of the payment account over a network by the payment account app on the mobile device from a process of a financial institution that maintains the payment account;
   verifying the payment amount included in payment authorization request is no greater than the retrieved available funds amount;
   receiving approval or denial input within the payment account app following receipt of valid payment account authentication input; and
   following receipt of approval input:
      generating authorized payment output to provide in response to the received payment authorization request;
      returning the authorized payment output to the app on the mobile device requesting payment; and
      transmitting data representative of at least a portion of the authorized payment output to a financial institution that maintains a payment account from which payment is to be made, the data representative of at least a portion of the authorized payment output notifying the financial institution of the authorization to preauthorize the financial institution to make the payment.

2. The method of claim 1, wherein:
   generating the authorized payment output includes generating a scanable barcode encoded with data to facilitate processing of the requesting payment by a source of the payment authorization request; and
   presenting the scanable barcode on a display of the mobile device.

3. The method of claim 1, wherein the available funds amount is a lesser amount of a daily payment account limit and an amount of funds within a pre-paid account or a credit limit of a post-paid account.

4. The method of claim 1, further comprising:
   upon receipt of the payment authorization request, transmitting, by the payment account app from the mobile device over a network to a payment authorization process of a financial institution that maintains the payment account, the received payment authorization request augmented with at least payment account identifying data;
   receiving, by the payment account app on the mobile device, an authorization of the payment authorization request from the payment authorization process; and
   presenting a user interface on the mobile device within which the approval or denial input is received.

5. The method of claim 4, further comprising:
   upon receipt of the approval input, transmitting data indicating receipt of the approval input in the payment account app from the mobile device to the payment authorization process of the financial institution, the indication of receipt of the approval input notifying the financial institution that a payment request will be forthcoming via a payment processing network.

6. The method of claim 1, wherein the authorized payment output includes payment account data for processing of the payment request on a payment processing network, at least a portion of the payment account data being a hashed representation thereof.

7. The method of claim 6, wherein the hashed representation of the at least a portion of the payment account data is generated within the payment account app on the mobile device by application of a hashing algorithm to the at least a portion of the payment account data.

8. A device comprising:
   at least one processor;
   at least one memory device;
   at least one input device;
   a display device;
   at least one network interface device; and
   a payment account app stored in the at least one memory device and executable by the at least one processor to perform data processing activities comprising:
      receiving a payment authorization request including a payment amount and payee identifying data via an application programming interface call made locally on the device by another app that executes on the at least one processor of the device, the payment authorization request triggering execution of the payment account app which then receives the payment authorization request;
      retrieving an available funds amount of the payment account over a network by the payment account app on the mobile device from a process of a financial institution that maintains the payment account;
      verifying the payment amount included in payment authorization request is no greater than the retrieved available funds amount;
      presenting a representation of the payment authorization request on the display device;
      receiving approval or denial input via the at least one input device following receipt of valid payment account authentication input via the at least one input device; and
      following receipt of approval input:
         generating authorized payment output to provide in response to the received payment authorization request;
         returning the authorized payment output to the originating app of the payment authorization request on the device; and
         transmitting, via the at least one network interface device, data indicating receipt of the approval input to a payment authorization process of a financial institution that maintains the payment account, the indication of receipt of the approval input notifying the financial institution that an authenticated payment request will be forthcoming via a payment processing network.

9. The device of claim 8, wherein:

generating the authorized payment output includes generating a scanable barcode encoded with data to facilitate processing of the requesting payment by a source of the payment authorization request; and presenting the scanable barcode on the display device.

10. The device of claim 8, wherein the authorized payment output includes payment account data for processing of the payment request on a payment processing network, at least a portion of the payment account data being a hashed representation thereof.

* * * * *